United States Patent
Iiyama et al.

(10) Patent No.: US 9,655,042 B2
(45) Date of Patent: May 16, 2017

(54) OPTICAL WIRELESS ACCESS SYSTEM

(71) Applicant: NIPPON TELEGRAPH AND TELEPHONE CORPORATION, Tokyo (JP)

(72) Inventors: Noriko Iiyama, Tokyo (JP); Jun-ichi Kani, Tokyo (JP); Naotaka Shibata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 98 days.

(21) Appl. No.: 14/419,885

(22) PCT Filed: Sep. 25, 2013

(86) PCT No.: PCT/JP2013/075924
§ 371 (c)(1),
(2) Date: Feb. 5, 2015

(87) PCT Pub. No.: WO2014/050898
PCT Pub. Date: Apr. 3, 2014

(65) Prior Publication Data
US 2015/0208347 A1    Jul. 23, 2015

(30) Foreign Application Priority Data

Sep. 27, 2012  (JP) ................................ 2012-213582

(51) Int. Cl.
*H04W 52/02* (2009.01)
*H04L 12/12* (2006.01)
(Continued)

(52) U.S. Cl.
CPC .. *H04W 52/0209* (2013.01); *H04B 10/25752* (2013.01); *H04B 10/27* (2013.01);
(Continued)

(58) Field of Classification Search
CPC . H04W 76/048; H04W 52/0209; H04W 8/24; H04W 52/0203; H04W 52/0258;
(Continued)

(56) References Cited

U.S. PATENT DOCUMENTS

2007/0189771 A1*  8/2007  Kim ..................... H04J 3/1694
                                                                     398/69
2010/0166173 A1*  7/2010  Yang ................... H04J 14/0252
                                                                     379/402
(Continued)

FOREIGN PATENT DOCUMENTS

| EP | 2445304 | 4/2012 |
| JP | 2011176555 | 9/2011 |
| JP | 2012074866 | 4/2012 |

OTHER PUBLICATIONS

Shen et al. "Fixed Mobile Convergence (FMC) Architectures for Broadband Access: Integration of EPON and WiMAX," 2007.*
International Preliminary Report on Patentability dated Apr. 9, 2015 corresponding to International Patent Application No. PCT/JP2013/075924, 7 pages.
CPRI. "CPRI Specification V4.2," Sep. 2010, http://www.cpri.info/spec.html.
(Continued)

*Primary Examiner* — Pao Sinkantarakorn
*Assistant Examiner* — Kabir Jahangir
(74) *Attorney, Agent, or Firm* — Ohlandt, Greeley, Ruggiero & Perle, L.L.P.

(57) ABSTRACT

An OLT of a PON obtains information on discontinuous reception of a UE from a BBU of LTE, and adjusts a sleep start timing and a sleep cycle of an ONU so that a recovery waiting time in the OLT with respect to downlink data transmitted from the BBU to the UE can be minimized.

21 Claims, 21 Drawing Sheets

(51) Int. Cl.
  *H04L 12/44* (2006.01)
  *H04B 10/2575* (2013.01)
  *H04W 8/24* (2009.01)
  *H04B 10/27* (2013.01)
  *H04W 88/08* (2009.01)
  *H04W 76/04* (2009.01)

(52) U.S. Cl.
  CPC .............. *H04L 12/12* (2013.01); *H04L 12/44* (2013.01); *H04W 8/24* (2013.01); *H04W 52/0203* (2013.01); *H04W 76/048* (2013.01); *H04W 88/085* (2013.01); *Y02B 60/50* (2013.01)

(58) Field of Classification Search
  CPC ...... H04W 88/085; H04L 12/44; H04L 12/12; H04B 10/25752; H04B 10/25753; Y02B 60/40; Y02B 60/42; Y02B 60/50
  See application file for complete search history.

(56) References Cited

U.S. PATENT DOCUMENTS

| | | | |
|---|---|---|---|
| 2011/0111765 A1* | 5/2011 | Yang | H04W 72/0486 455/452.1 |
| 2012/0094654 A1 | 4/2012 | Kim et al. | |
| 2012/0243871 A1* | 9/2012 | Huang | H04B 10/272 398/58 |
| 2014/0226736 A1* | 8/2014 | Niu | H04L 27/2628 375/260 |
| 2015/0201375 A1* | 7/2015 | Vannithamby | H04W 24/04 370/311 |

OTHER PUBLICATIONS

ITU-T Recommendation G.987.3, "10 Gigabit-capable Passive Optical Networks: Transmission Convergence layer specification".
International Search Report dated Nov. 19, 2013 corresponding to International Application No. PCT/JP2013/075924; 4 pages.

* cited by examiner

OPTICAL WIRELESS ACCESS SYSTEM

TECHNICAL FIELD

The present invention relates to a scheduler for dynamic resource allocation in a cellular system and an optical access system are mixed.

BACKGROUND ART

In cellular systems such as LTE (Long Term Evolution) and WiMAX (Worldwide Interoperability for Microwave Access), a terminal performs wireless communication with a base station. Usually, since one base station communicates with a plurality of terminals, the base station performs scheduling for dynamically allocating finite communication capacity (resource) to each terminal so as to prevent interference of signals between the terminals. When uplink communication in the LTE is taken as an example, a sequence from when a terminal (UE: User Equipment) as a wireless terminal generates uplink data to when the terminal transmits the data to a base station (eNB) is as shown in FIG. 1. First, when UE 92 requests bandwidth from eNB 91, the eNB 91 obtains information (such as an amount of buffer data and a channel state) required for scheduling of the uplink data, therefore the eNB 91 allocates a resource for transmitting those information to the UE 92, and gives notice to the UE 92 by returning a response.

When the UE 92 transmits the information, required for scheduling the uplink data in the allocated resource, to the eNB 91, the eNB 91 performs scheduling and allocates the resource for transmitting the uplink data to the UE 92 using a scheduling grant. The UE 92 can transmit the uplink data to the eNB 91 only after these exchanges. In the downlink communication, since the number of the base station transmitting a signal is one, interference does not occur, and thus the exchanges before communication between the UE 92 and eNB 91 are not usually performed.

In a cellular system, in order to enhance the degree of freedom of cell configuration, the function of the eNB 91 is divided into a base band signal processing unit (BBU: Base Band Unit) 81 and an RF signal transmitting/receiving unit (RRH: Remote Radio Head) 83, whereby physically separated configuration can be achieved. Although a radio signal between the BBU 81 and the RRH 83 can be transmitted through an optical fiber by an RoF (Radio over Fiber) technique, recently, a digital RoF technique excellent in transmission quality compared with an analogue RoF technique has been particularly actively studied, and use formulation has been progressed under a standards body such as CPRI (Common Public Radio Interface) (see, for example Non Patent Literature 1).

As a connection form between the BBU 81 and the RRH 83, a point-to-multipoint form utilizing a PON (Passive Optical Network) system can be taken. In this case, as shown in FIG. 2, the BBU 81 and the RRH 83 are connected to each other by optical fibers and an optical splitter 84. In PON, since OLT (Optical Line Terminal) 10 as an single terminal station device communicates with ONUs (Optical Network Units) 82 as a plurality of subscriber devices in its nature, the OLT 10 performs scheduling for dynamically allocating capacity to the ONUs 82.

A sequence until the ONU 82 transmits uplink data to the OLT 10 in normal PON is shown in FIG. 3. As in the LTE, although the scheduling on the OLT 10 side requires information (REPORT) such as an amount of data buffered in the ONU 82, the REPORT can be transmitted only at a timing allocated by a transmission permission signal transmitted from the OLT 10. The OLT 10 performs scheduling based on REPORT information, allocates a resource for transmitting the uplink data to the ONU 82, and notifies the ONU 82 of this through GATE. The ONU 82 can transmit the uplink data to the OLT 10 only after these exchanges. In the downlink communication, the exchanges before communication between the OLT 10 and the ONU 82 are not particularly performed.

In a system shown in FIG. 2, the system is in a state in which schedulers of two systems, that is, a cellular and PON are mixed in a single system, and, for example, a sequence of uplink communication from the UE 92 becomes as shown in FIG. 4 based on FIGS. 1 and 3. In this case, the bandwidth requirement or the notification of the amount of buffer data before sending uplink data transmitted from the UE 92 cannot be transmitted without going through all sequences of the uplink communication of the PON.

Meanwhile, in order to save power consumption of the device, the cellular system and the PON may have a function of pausing some devices on the side where a plurality of devices exist during a time when communication is not performed. Regardless of a system, a transmitting side usually enters a pause state when a transmission data amount is small and is recovered from the pause state when transmission data is generated. In a receiving side, since data to be received may exist while the receiving side pauses, the receiving side is often set to recover from the pause state at fixed intervals of time and confirm the existence of the data to be received.

As an example of the above, in discontinuous reception of the LTE, a sequence from a normal receiving state to start of the discontinuous reception and a sequence to termination of the discontinuous reception are shown in FIGS. 5 and 6, respectively. The UE 92 starts the discontinuous reception when a resource is not allocated if a constant time T1 or more is elapsed from the latest allocation of a radio resource to the UE 92 (FIG. 5). When the UE 92 is in an discontinuous reception state, the UE 92 repeats such an operation that some devices relating to reception are paused only for a time T2 and recover from the pause state for a time T3. When it is detected that a resource for downlink communication is allocated within the time T3 when the UE 92 is in a recover state, the UE 92 recovers from the discontinuous reception state (FIG. 6). Although cyclic parameters of T1 to T3 for the discontinuous reception is designated by the eNB 91 during connection, there is no particular regulation on notification from the UE 92 to the eNB 91 before the UE 92 enters the discontinuous reception state, and the operation can be performed as an independent operation on the terminal side.

Meanwhile, a control message and a state transition diagram for realizing sleep of the ONU 82 in the PON are prescribed by ITU-T G.987.3 (see, for example Non Patent Literature 2). Messages such as Sleep Allow (ON) for which the OLT 10 allows each of the ONUs 82 to sleep, Sleep Allow (OFF) for which the OLT 10 forbids each of the ONUs 82 to sleep, Sleep Request (Sleep) for which the ONU 82 requires the OLT 10 to sleep, and Sleep Request (Awake) for which the ONU 82 requires the OLT 10 to awake are specified.

PON sleep based on G.987.3 is different from the discontinuous reception of the LTE in that the OLT 10 manages a sleep state of the ONU 82. An example of a procedure until sleep is started and an example of a procedure until the sleep state shifts to an active state are shown in FIGS. 7 and 8, respectively. When the OLT 10 does not detect a downlink frame addressed to the relevant ONU 82 only for a fixed time T4, the Sleep Allow (ON) is transmitted from the OLT 10 to the ONU 82, and the ONU 82 transmits the Sleep Request (Sleep) to the OLT 10 and enters the sleep state (FIG. 7). The sleep is cyclic as with the discontinuous reception of the LTE, and the ONU 82 repeats such an operation that the ONU 82 maintains the sleep state only for a time T5 and then recovers only for a time T6. Before the ONU 82 shifts from the sleep state to the active state, the ONU 82 receives the Sleep Allow (OFF) from the OLT 10 within the time T6 and returns the Sleep Request (Awake) (FIG. 8). The ONU 82 receives a frame addressed to the ONU 82 itself after shifting to the active state.

When the LTE and the PON each have such functions including the discontinuous reception and the sleep as described above, in a system in which they are combined as shown in FIG. 2, each system can pause a portion of a device. In the system as shown in FIG. 2, a sequence to start of the sleep of the PON when the discontinuous reception and sleep control of each of the LTE and the PON are independently operated is shown in FIGS. 9 and 10. FIGS. 9 and 10 show, respectively, a case where the last traffic before shifting to the discontinuous reception and the sleep state is downlink data and a case where the last traffic is uplink data. For both the cases, while in the LTE the UE 92 shifts to the discontinuous reception once a time T1 has elapsed from the last traffic, in the PON the OLT 10 transmits the Sleep Allow (ON) to the ONU 82 once the time T4 has elapsed from the last traffic, and the ONU 82 shifts to the sleep state.

CITATION LIST

Non Patent Literature

[Non Patent Literature 1]
CPRI, "CPRI Specification V4.2," September, 2010,
[Non Patent Literature 2]
ITU-T Recommendation G.987.3, "10 Gigabit-capable Passive Optical Networks: Transmission Convergence layer specification"

SUMMARY OF INVENTION

Technical Problem

In the system of FIG. 2, there is supposed a situation in which when the UE 92 of the LTE is in the discontinuous reception state, and when the ONU 82 of the PON is in the sleep state, a downlink traffic occurs. Since each value of T1, T2, and T3 is usually known to the eNB 91 of the LTE, it is possible to grasp a state of an inactivity timer of the UE 92 and the cycle of the discontinuous reception. Similarly, since the OLT 10 of the PON should manage the sleep state of the ONU 82, the sleep state and the cycle can be grasped. Accordingly, when the down traffic occurs in each independent system, the eNB 91 and the OLT 10 buffer the downlink data for aiming at a recovery cycle from the pause state of the UE 92 as well as the sleep of the ONU 82, as shown in FIGS. 11 and 12, and downlink communication can be performed with the same timing. The buffer time is referred to as a "recovery cycle waiting time".

However, in the system as shown in FIG. 2 in which those systems are combined, when a scheduler is operated independently, the eNB 91 cannot predict a recovery waiting time in a PON section present in a region ranging to the UE 92, and this may cause some problems. Examples in which problems occur are shown in FIGS. 13 and 14.

In the example of FIG. 13, a timing of the downlink data transmitted from the BBU 81 for aiming at the recovery cycle of the UE 92 is shifted by a buffer waiting for the recovery cycle of the PON, and a signal arrives when the UE 92 is in the pause state and cannot be received by the UE 92. In this case, the BBU 81 detects that the UE 92 cannot receive the downlink data based on the fact that ACK is not returned, and retransmission of the downlink data is repeated until the timings become the same, so that a transmission capacity is used wastefully.

Meanwhile, in FIG. 14, despite the fact that the downlink data transmitted from the BBU 81 could be received according to the recovery cycle of the UE 92, it is judged that ACK is not still returned before the ACK arrives at the BBU 81 due to the buffer in the recovery waiting time in the OLT 10, and the BBU 81 starts to retransmit the downlink data. Also in this example, data that would normally reach is retransmitted, so that the transmission capacity is used wastefully.

An object of the present invention is to prevent the downlink data from being repeatedly retransmitted during the discontinuous reception of the UE 92 and the sleep operation of the ONU 82 and thereby prevent the transmission capacity from being used wastefully.

Solution to Problem

In order to achieve the above object, in the invention of the present application, the OLT 10 of the PON obtains information on the discontinuous reception of the UE 92 from the BBU 81 of the LTE, and a sleep start timing and the cycle of the ONU 82 are adjusted so that the recovery waiting time in the OLT 10 with respect to the downlink data transmitted from the BBU 81 to the UE 92 can be minimized.

Specifically, an optical wireless access system according to the present invention is one in which a plurality of subscriber devices are connected to a terminal device using optical transmission paths, and downlink data is transmitted from a baseband signal processing portion connected to the terminal device to an RF signal transmitting/receiving portion connected to the subscriber device, and the terminal device obtains information on discontinuous reception of a wireless terminal, wirelessly connected to the RF signal transmitting/receiving portion, from the baseband signal processing portion and perform sleep control of the subscriber device based on the information.

In the optical wireless access system according to the present invention, the terminal device may have a wireless communication information read-in portion obtaining the information on the discontinuous reception of the wireless terminal from the baseband signal processing portion, and the wireless communication information read-in portion may be connected to the baseband signal processing portion by using a line different from the downlink data.

In the optical wireless access system according to the present invention, the terminal device may have a wireless communication information read-in portion obtaining the information on the discontinuous reception of the wireless terminal from the baseband signal processing portion, and the wireless communication information read-in portion may be connected to the baseband signal processing portion by using a line common to the downlink data and may identify the downlink data and the information on the discontinuous reception of the wireless terminal using a control protocol.

In the optical wireless access system according to the present invention, the terminal device may further include a controller which calculates a sleep start timing and a sleep cycle of the subscriber device so that a recovery waiting time in the terminal device with respect to the downlink data can be reduced using the obtained information on the discontinuous reception.

In the optical wireless access system according to the present invention, the terminal device may further include a controller which sets a sleep cycle time, a recovery cycle time, or the sum of them of the subscriber device to respective values that are the same as or the integer times a pause cycle time of the discontinuous reception of the wireless terminal, a recovery cycle time of the discontinuous reception of the wireless terminal, or the sum of them, using the obtained information on the discontinuous reception.

In the optical wireless access system according to the present invention, the terminal device may further include a controller which starts sleep of the subscriber device when going back in transmission delay time from the subscriber device to the wireless terminal from a pause start timing of the wireless terminal, using the obtained information on the discontinuous reception.

In the optical wireless access system according to the present invention, the terminal device may further include a controller which recovers the subscriber device when going back in transmission delay time from the subscriber device to the wireless terminal from a recovery time of the wireless terminal, using the obtained information on the discontinuous reception.

Specifically, a terminal device according to the present invention is one used in an optical wireless access system in which a plurality of subscriber devices are connected to the terminal device using optical transmission paths, and downlink data is transmitted from a baseband signal processing portion connected to the terminal device to an RF signal transmitting/receiving portion connected to the subscriber device, and the terminal device obtains information on discontinuous reception of a wireless terminal, wirelessly connected to the RF signal transmitting/receiving portion, from the baseband signal processing portion and performs sleep control of each of the subscriber devices based on the information.

The terminal device according to the present invention may include a wireless communication information read-in portion obtaining information on the discontinuous reception of the wireless terminal from the baseband signal processing portion, and the wireless communication information read-in portion may be connected to the baseband signal processing portion by using a line different from the downlink data.

The terminal device according to the present invention may include a wireless communication information read-in portion obtaining information on the discontinuous reception of the wireless terminal from the baseband signal processing portion, and the wireless communication information read-in portion may be connected to the baseband signal processing portion by using a line common to the downlink data and may identify the downlink data and the information on the discontinuous reception of the wireless terminal using a control protocol.

The terminal device according to the present invention may further include a controller which calculates a sleep start timing and a sleep cycle of the subscriber device so that a recovery waiting time in the terminal device with respect to the downlink data can be reduced using the obtained information on the discontinuous reception.

The terminal device according to the present invention may further include a controller which sets a sleep cycle time of the subscriber device, a recovery cycle time of the subscriber device, or the sum of them to respective values that are the same as or the integer times a pause cycle time of the discontinuous reception of the wireless terminal, a recovery cycle time of the discontinuous reception of the wireless terminal, or the sum of them, using the obtained information on the discontinuous reception.

The terminal device according to the present invention may further include a controller which starts sleep of the subscriber device when going back in transmission delay time from the subscriber device to the wireless terminal from a pause start timing of the wireless terminal, using the obtained information on the discontinuous reception.

The terminal device according to the present invention may further include a controller which recovers the subscriber device when going back in transmission delay time from the subscriber device to the wireless terminal from a recovery time of the wireless terminal, using the obtained information on the discontinuous reception.

Specifically, a sleep control method in an optical wireless access system according to the present invention is one in which a plurality of subscriber devices are connected to the terminal device using optical transmission paths, and downlink data is transmitted from a baseband signal processing portion connected to the terminal device to an RF signal transmitting/receiving portion connected to the subscriber device, and the terminal device obtains information on discontinuous reception of a wireless terminal, wirelessly connected to the RF signal transmitting/receiving portion, from the baseband signal processing portion and performs sleep control of each of the subscriber devices based on the information.

In the sleep control method according to the present invention, in the sleep control of each of the subscriber devices, the information on the discontinuous reception of the wireless terminal may be obtained from the baseband signal processing portion, using a line different from the downlink data.

In the sleep control method according to the present invention, in the sleep control of each of the subscriber devices, the information on the discontinuous reception of the wireless terminal may be obtained by identifying the downlink data and the information on the discontinuous reception of the wireless terminal using a control protocol from among information obtained from the baseband signal processing portion by using a line common to the downlink data.

In the sleep control method according to the present invention, in the sleep control of each of the subscriber devices, a sleep start timing and a sleep cycle of the subscriber device may be calculated so that a recovery waiting time in the terminal device with respect to the downlink data can be reduced using the obtained information on the discontinuous reception.

In the sleep control method according to the present invention, in the sleep control of each of the subscriber devices, values of a sleep cycle time of the subscriber device, a recovery cycle time of the subscriber device, or the sum of them may be set to respective values that are the same as or the integer times a pause cycle time of the discontinuous reception of the wireless terminal, a recovery cycle time of the discontinuous reception of the wireless terminal, or the sum of them, using the obtained information on the discontinuous reception.

In the sleep control method according to the present invention, in the sleep control of each of the subscriber devices, sleep of the subscriber device may be started when going back in transmission delay time from the subscriber device to the wireless terminal from a pause start timing of the wireless terminal, using the obtained information on the discontinuous reception.

In the sleep control method according to the present invention, in the sleep control of each of the subscriber devices, the subscriber device may be recovered when going back in transmission delay time from the subscriber device to the wireless terminal from a recovery time of the wireless terminal, using the obtained information on the discontinuous reception.

Advantageous Effects of Invention

According to the present invention, wasteful use of a transmission capacity can be prevented by preventing a downlink signal from being repeatedly retransmitted during discontinuous reception of a UE and sleep operation of ONU 82.

DESCRIPTION OF EMBODIMENTS

Figure 1:
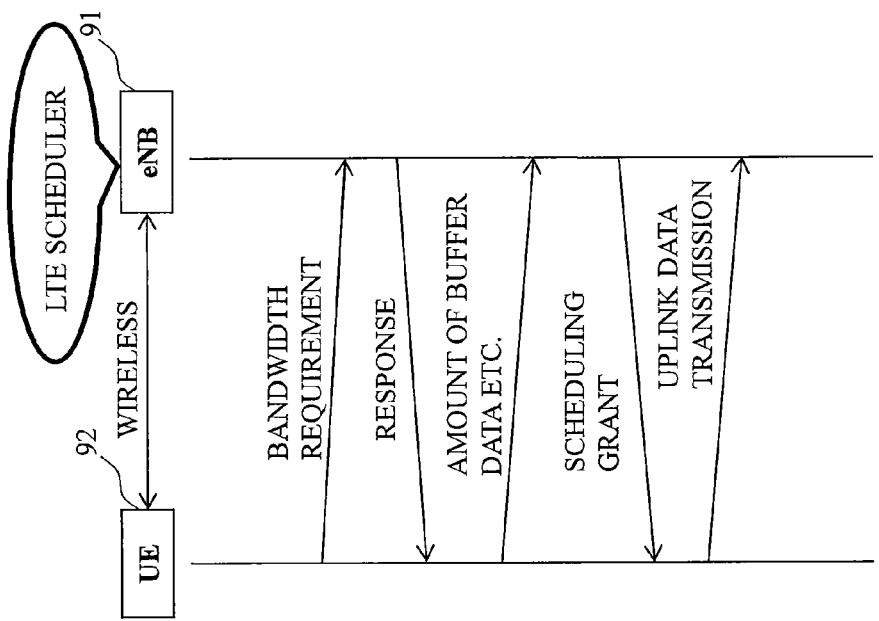
FIG. 1 shows an example of an uplink communication sequence in LTE.

Embodiments of the present invention will be described with reference to the accompanying drawings. The embodiments to be described hereinafter are examples of the present invention, and the present invention is not limited to the following embodiments. Those embodiments can be practiced in forms variously modified and improved based on the knowledge of those skilled in the art. Components denoted by the same reference numerals in the present specification and the drawings mutually denote the same components.

Embodiment 1

Figure 15:
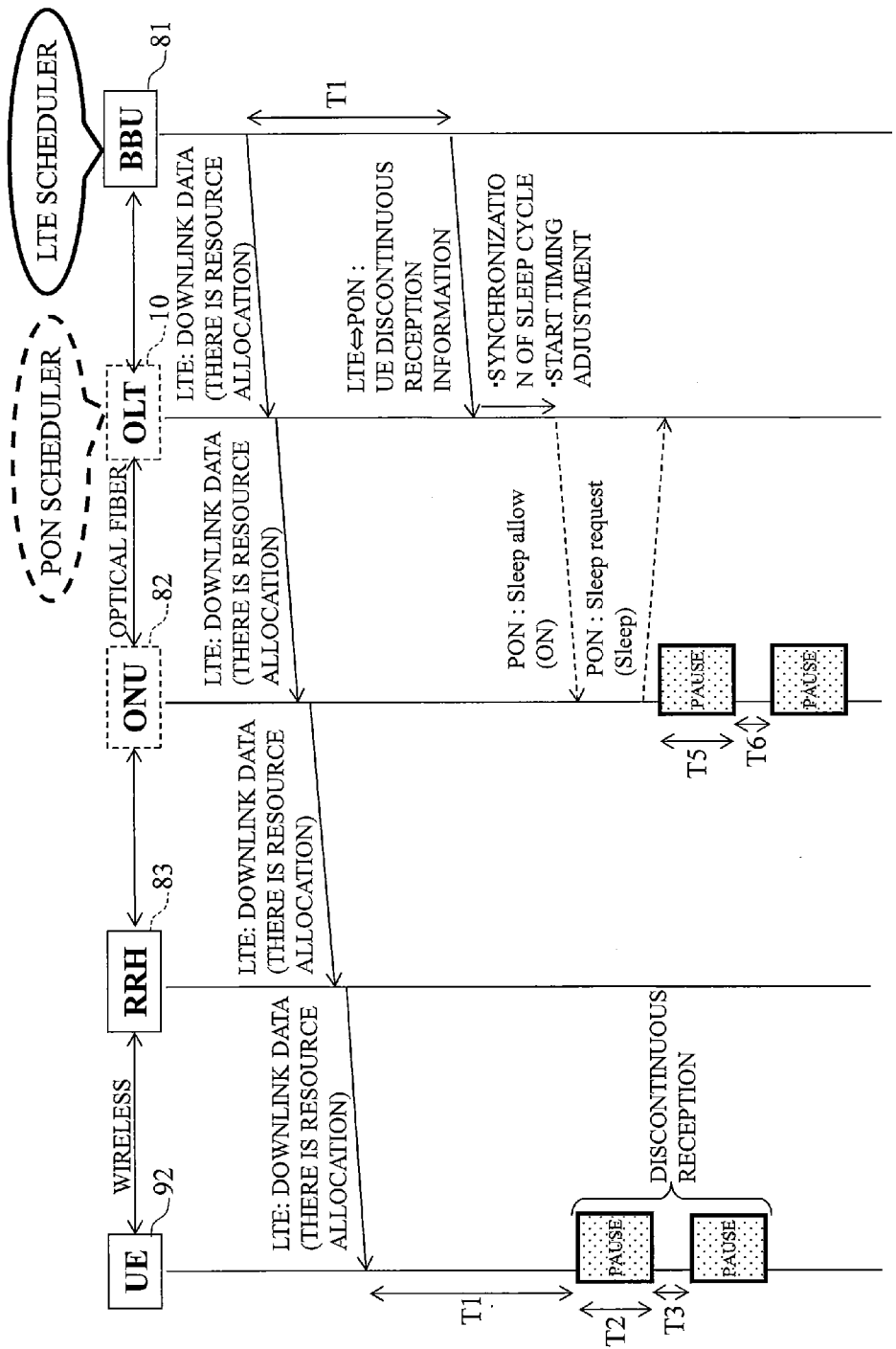
FIG. 15 shows an example of a sequence to the start of the sleep of the PON after the downlink data transmission in the optical wireless access system.
Figure 16:
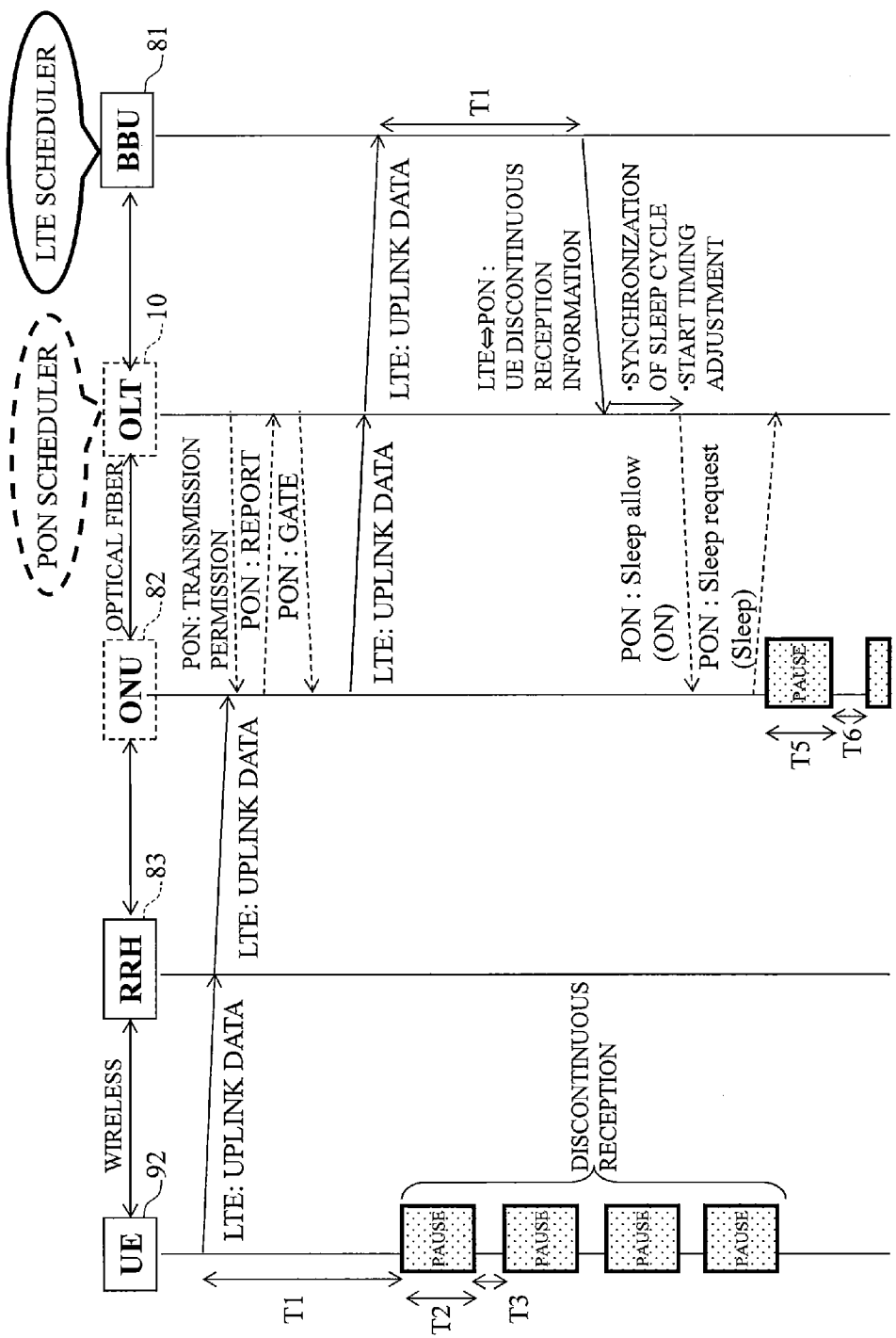
FIG. 16 shows an example of a sequence to the start of the sleep of the PON after the uplink data transmission in the optical wireless access system.

A sequence to start of sleep of PON in an optical wireless access system is shown in FIGS. 15 and 16. FIGS. 15 and 16 show, respectively, a case where the last traffic before shifting to discontinuous reception and a sleep state is downlink data and a case where the last traffic is uplink data.

Figure 2:
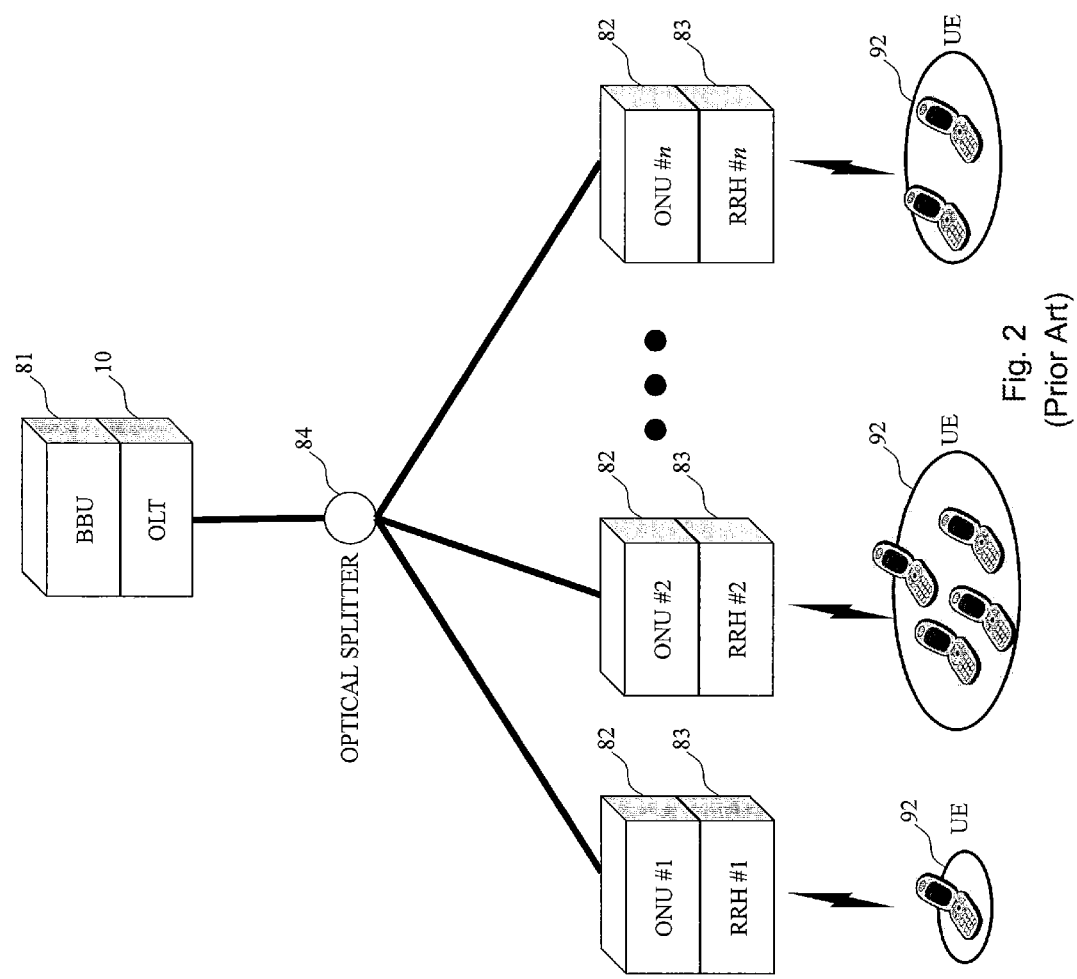
FIG. 2 shows an example of a configuration of an optical wireless access system.
Figure 3:
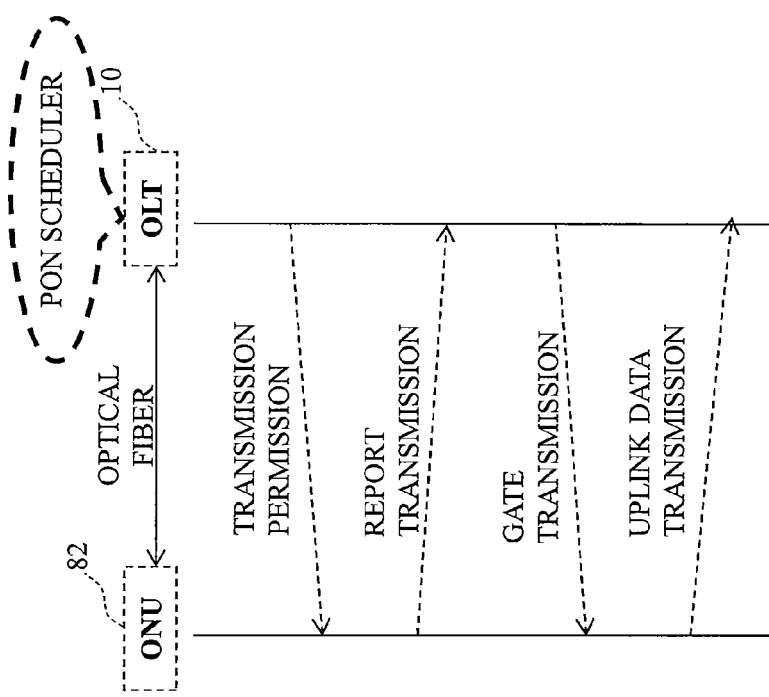
FIG. 3 shows an example of the uplink communication sequence in PON.
Figure 4:
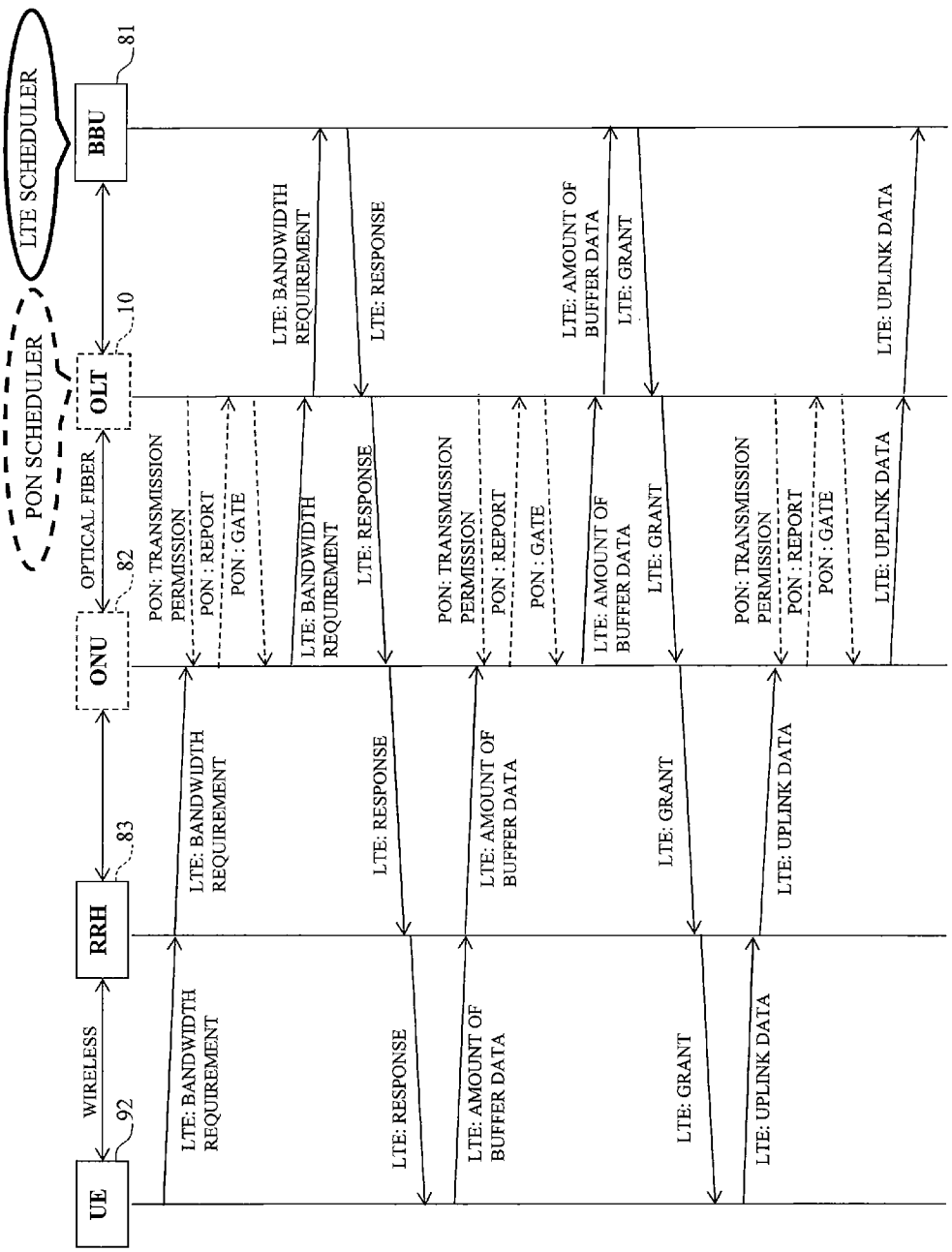
FIG. 4 shows an example of an uplink communication sequence in the optical wireless access system.
Figure 5:
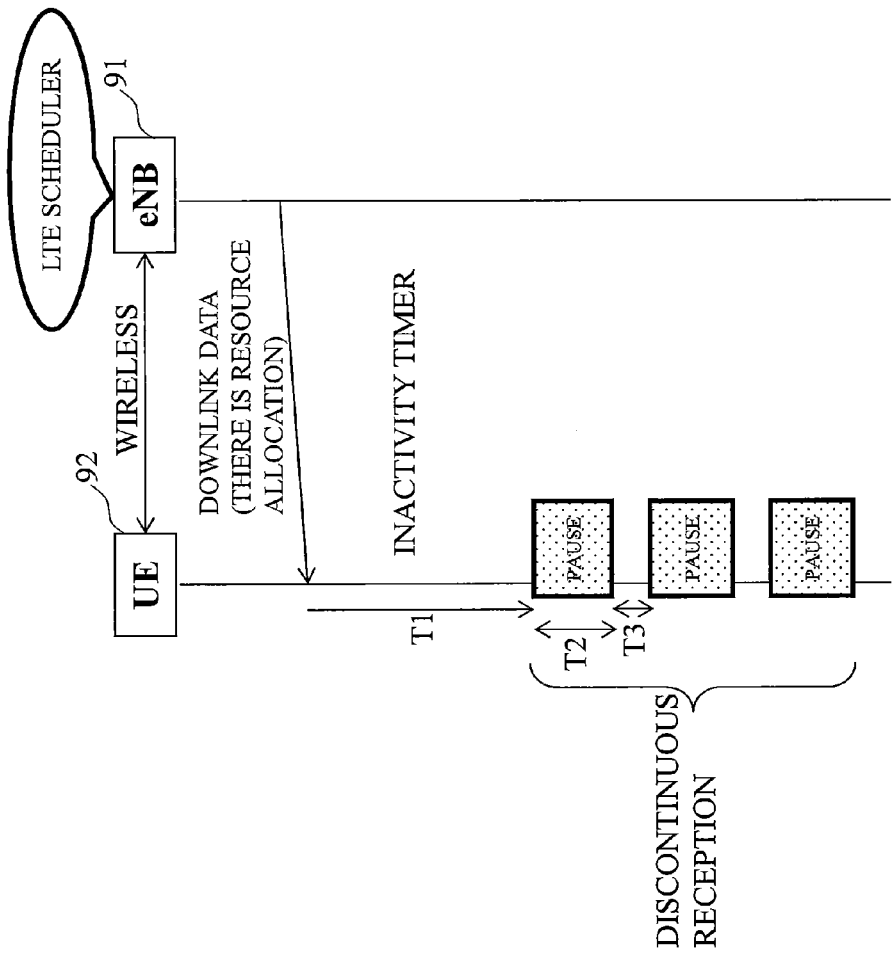
FIG. 5 shows an example of a start sequence of discontinuous reception of UE in the LTE.
Figure 6:
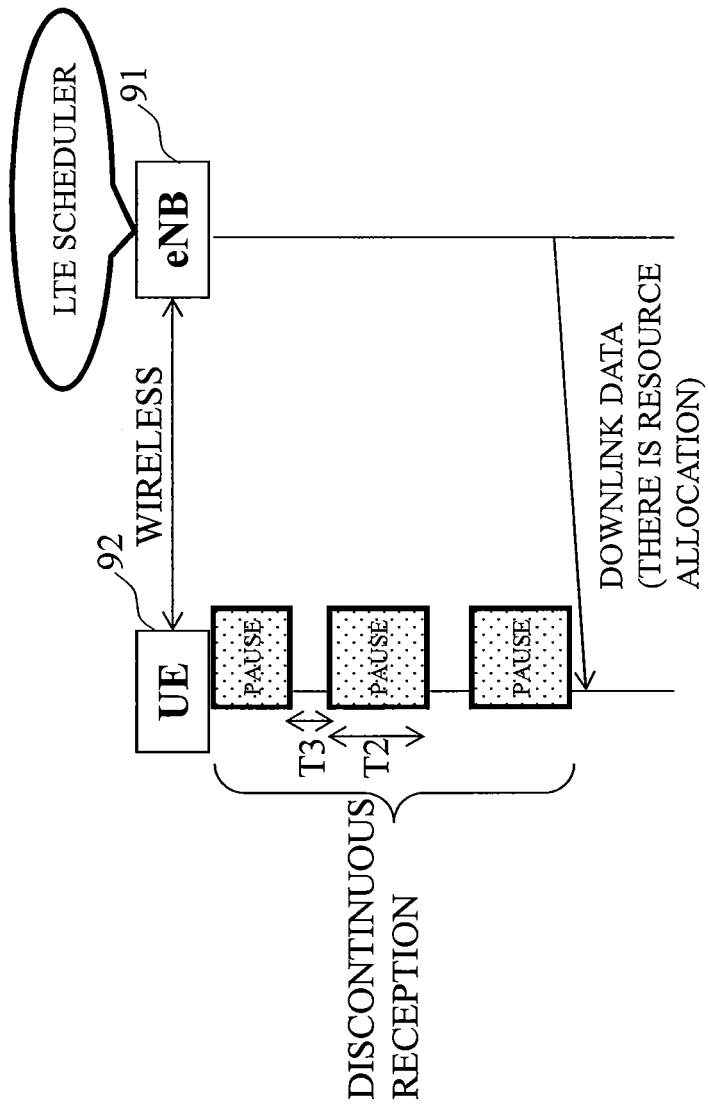
FIG. 6 shows an example of a termination sequence of the discontinuous reception of the UE in the LTE.
Figure 7:
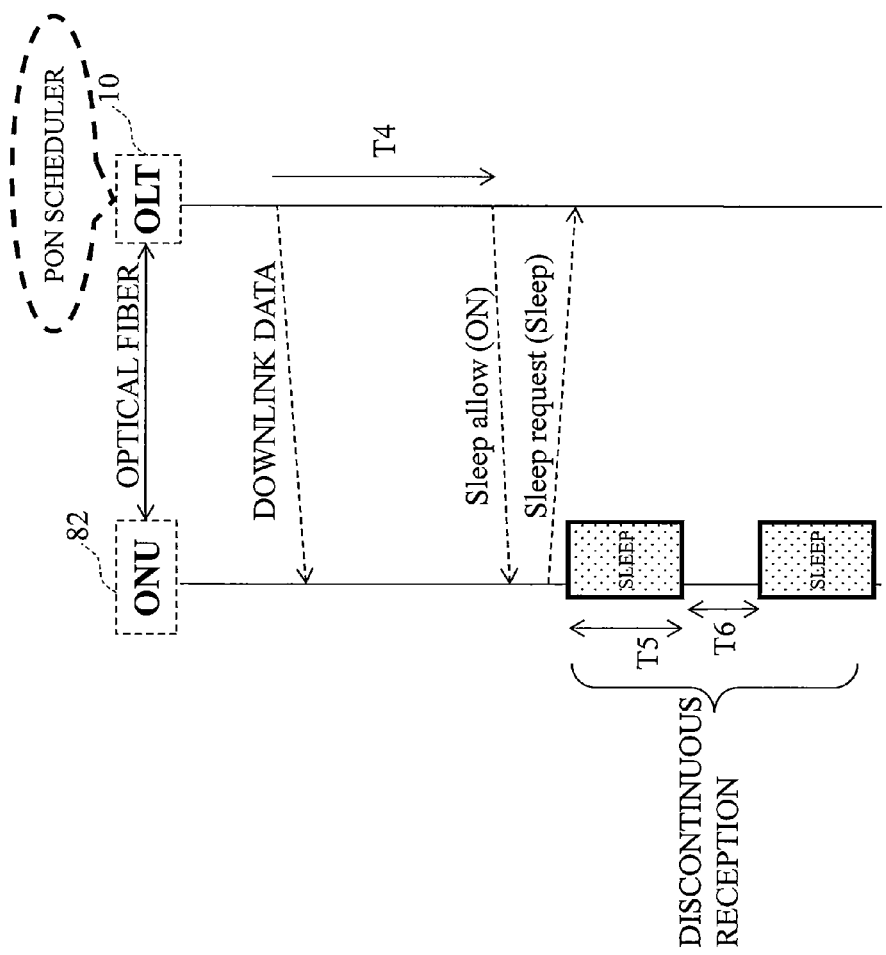
FIG. 7 shows an example of a sleep start sequence of ONU in the PON.
Figure 8:
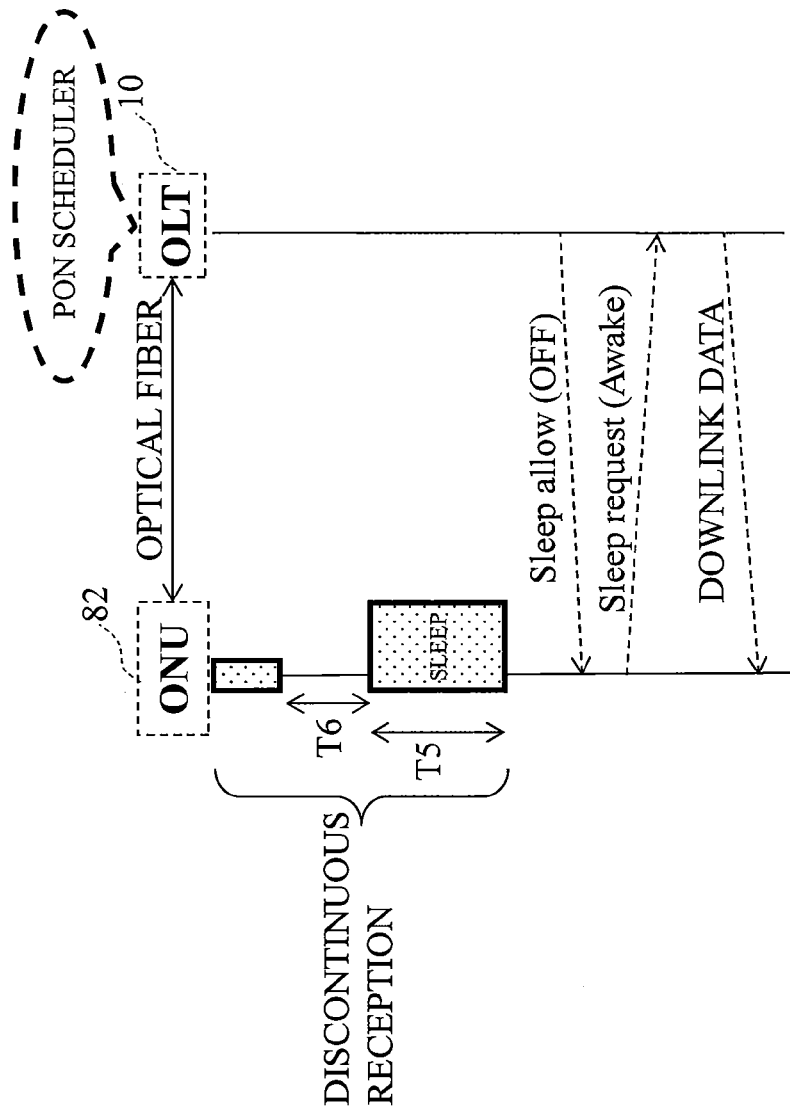
FIG. 8 shows an example of a sleep termination sequence of the ONU in the PON.
Figure 9:
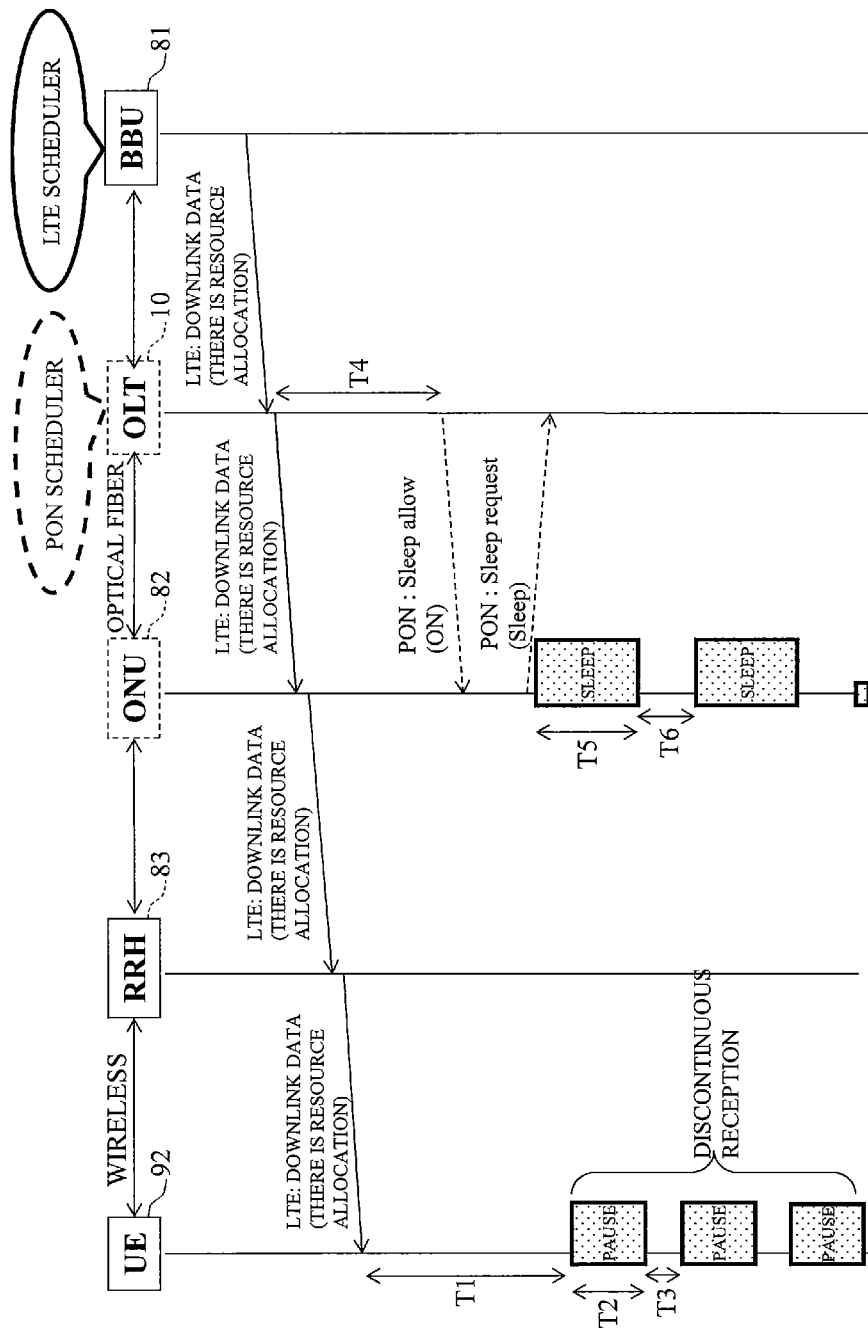
FIG. 9 shows an example of a sequence to start of sleep in the PON after downlink data transmission.
Figure 10:
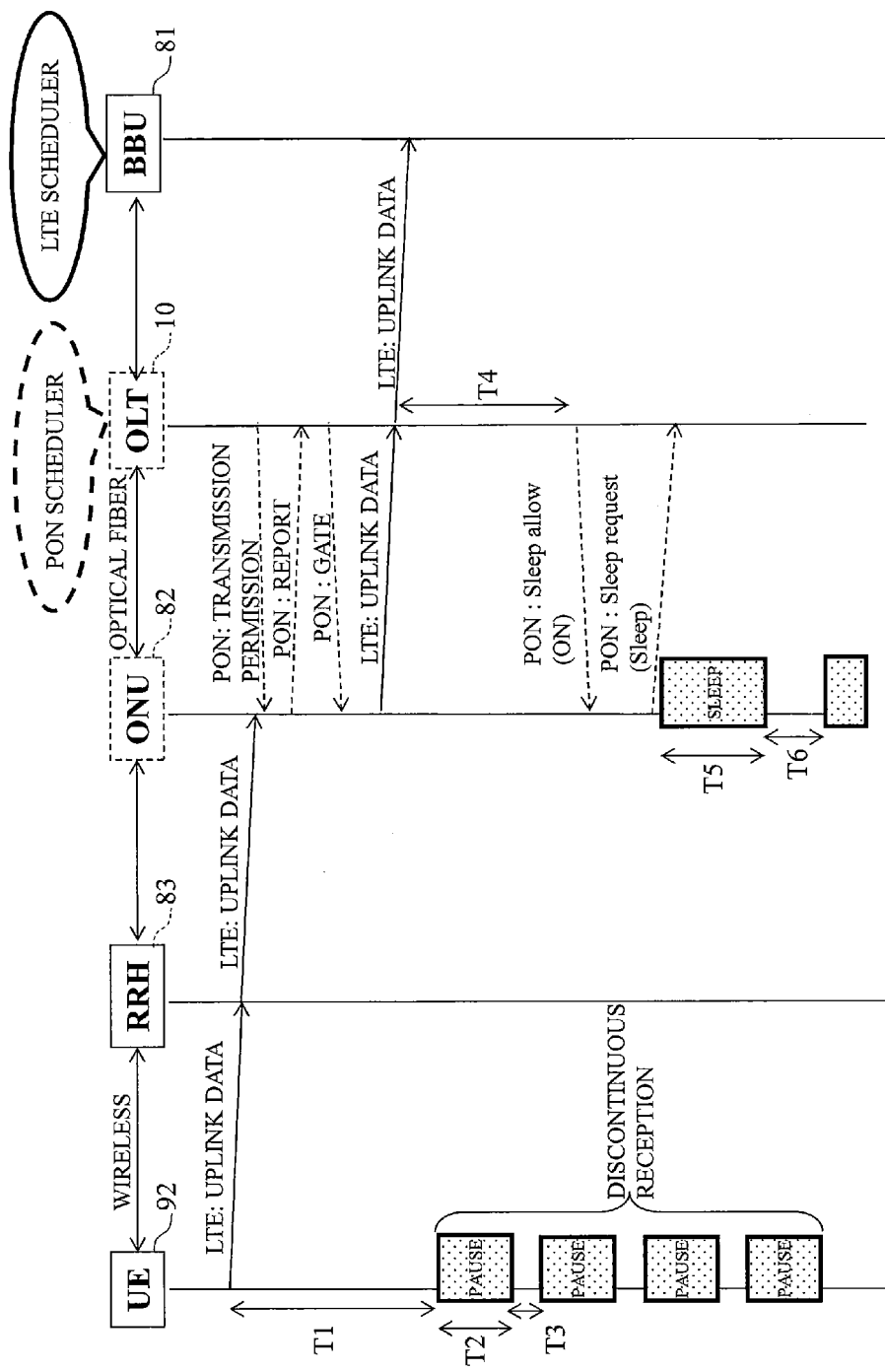
FIG. 10 shows an example of a sequence to the start of the sleep in the PON after uplink data transmission.
Figure 11:
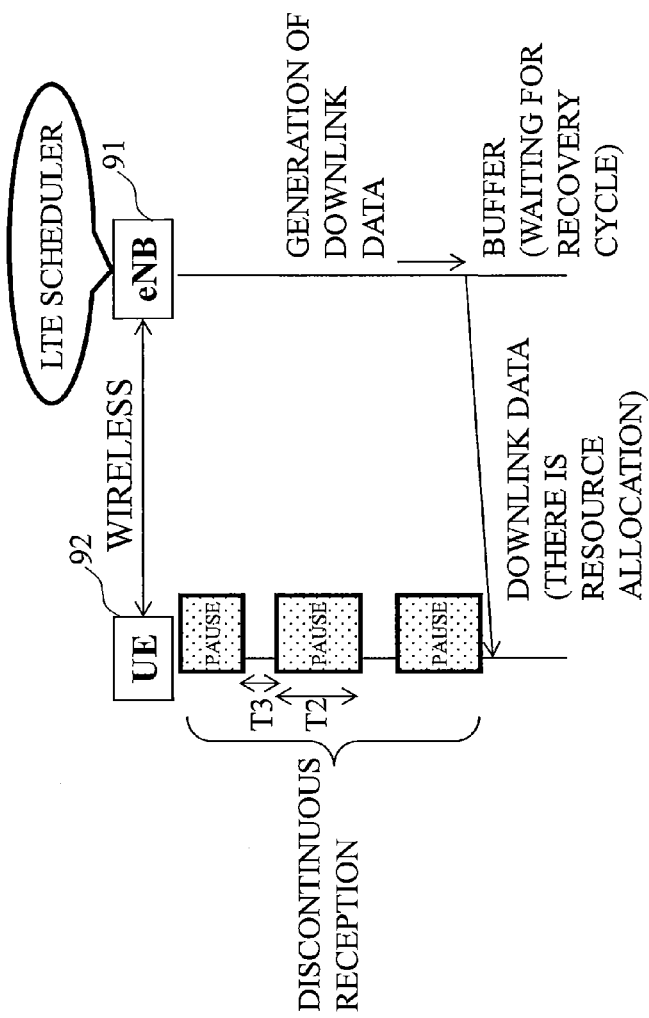
FIG. 11 shows an example when the discontinuous reception of the UE in the LTE is terminated.
Figure 12:
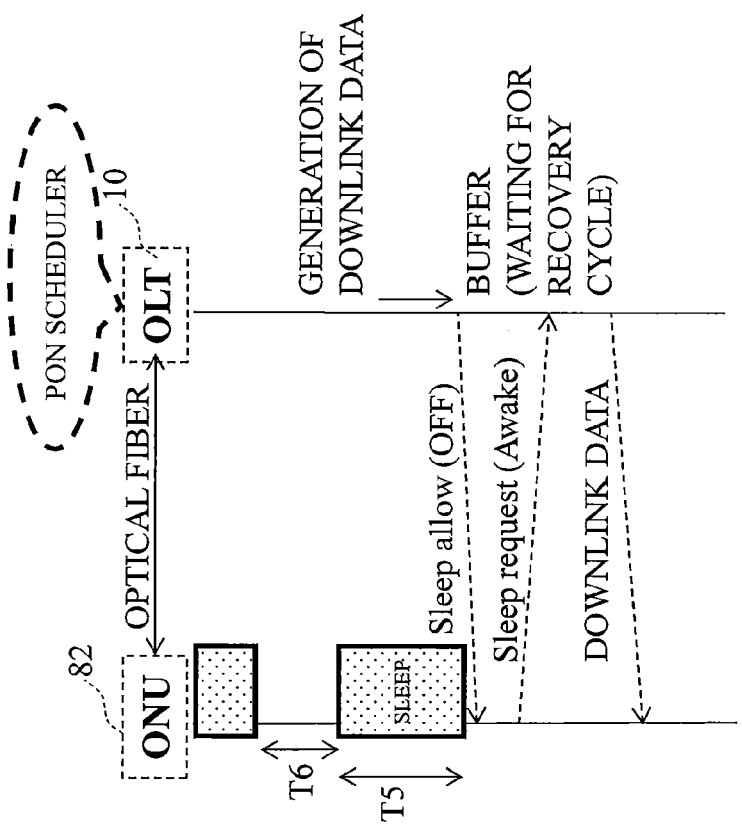
FIG. 12 shows an example when the sleep of the ONU is terminated in the PON.
Figure 13:
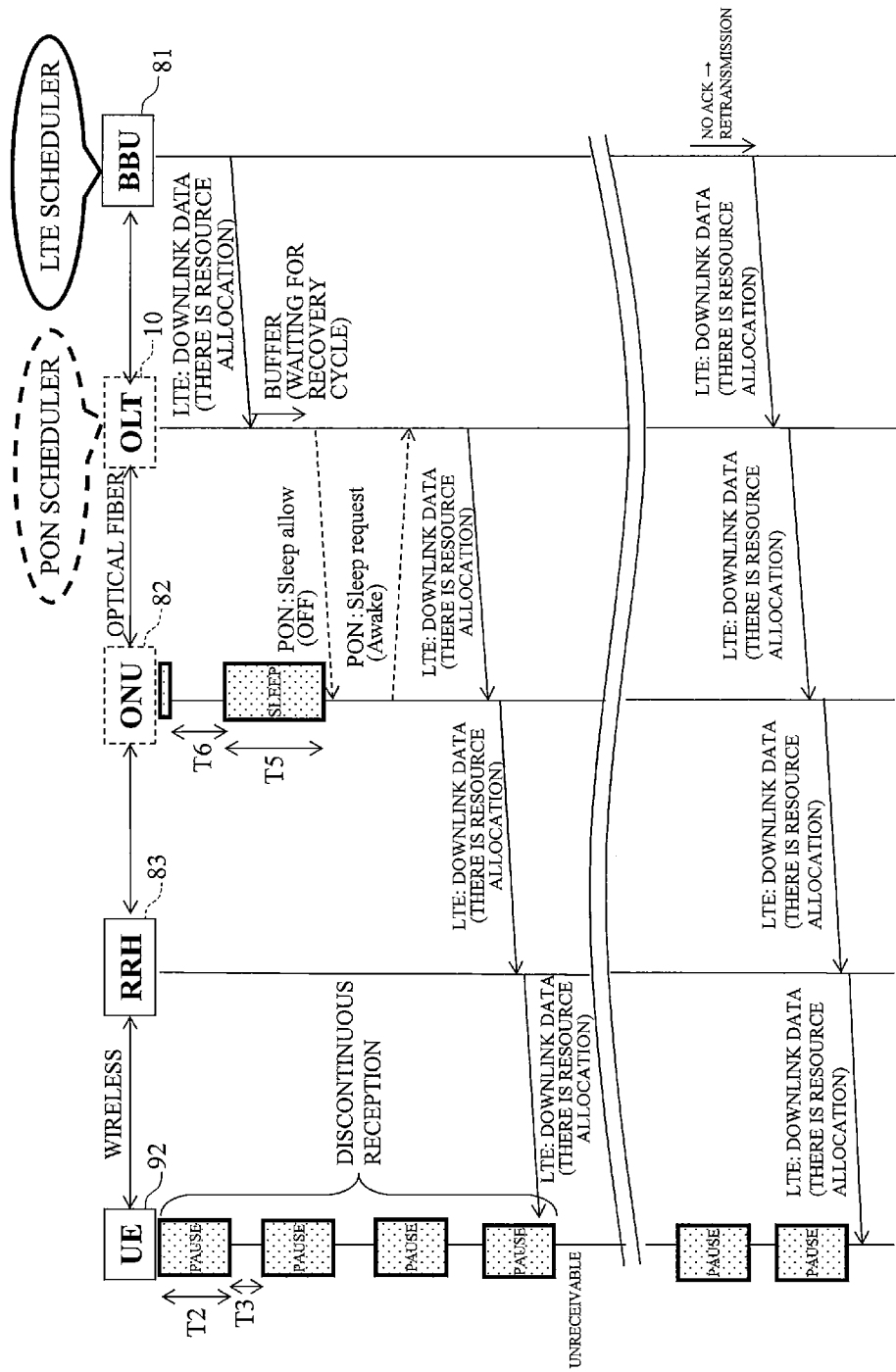
FIG. 13 shows a first example of retransmission according to recovery cycle waiting in the PON.
Figure 14:
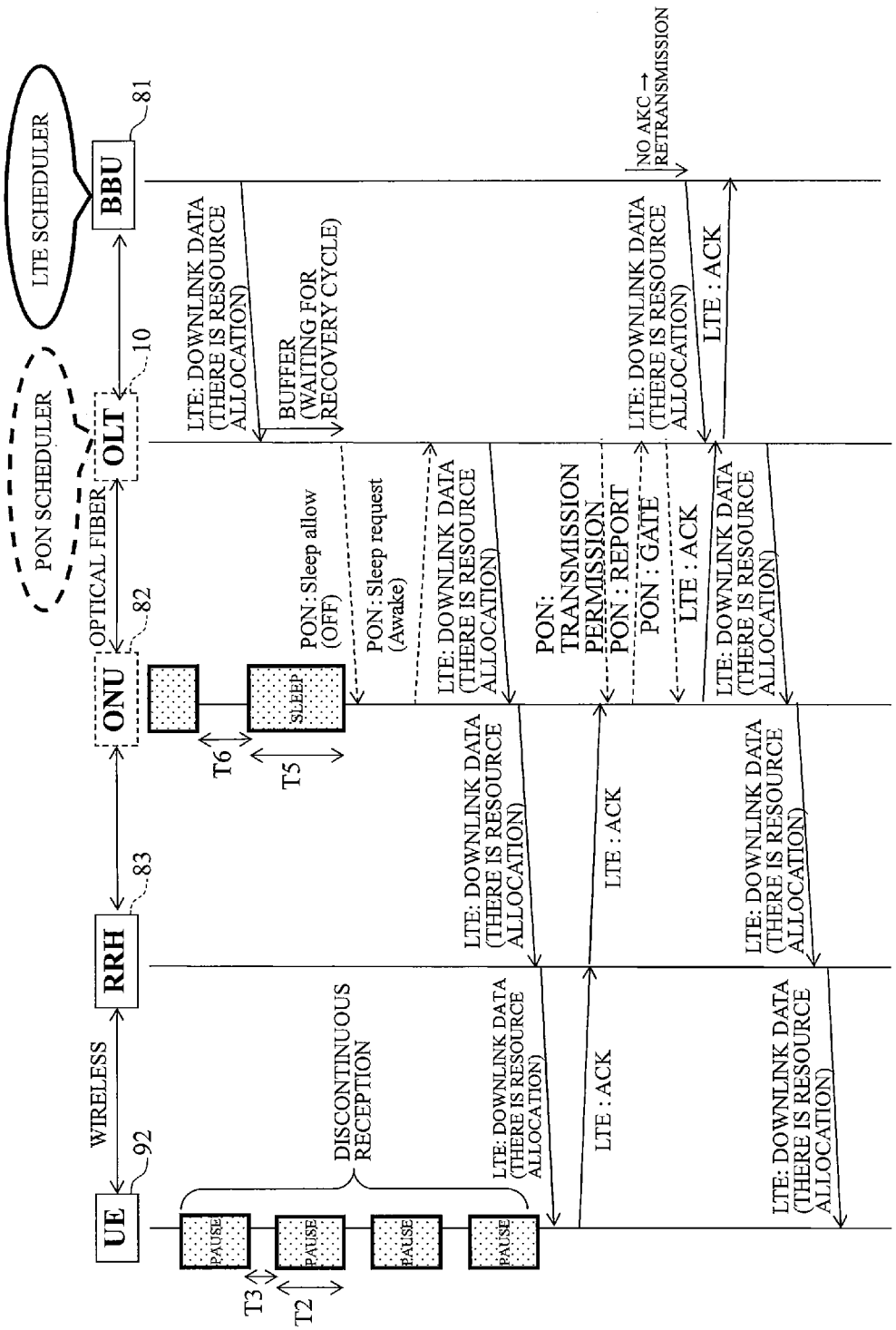
FIG. 14 shows a second example of the retransmission according to recovery cycle waiting in the PON.

In a system as shown in FIG. 2, since downlink data arriving at the OLT 10 is only downlink data from BBU 81, the downlink data of the PON should not be observed during a time when the downlink data of LTE is not generated. Thus, FIGS. 15 and 16 are different from FIGS. 9 and 10, and the OLT 10 does not use a unique timer in the judgment of transition to a sleep state.

For both the cases of FIGS. 15 and 16, the BBU 81 predicts whether each of the UEs 92 is in an discontinuous reception state, using a timer from a time when the last traffic occurs for each of the UEs 92 and passes information such as an discontinuous reception start time of each of the UEs 92 and cyclic parameters T2 and T3 to the OLT 10. The OLT 10 judges the transition to the sleep state based on the received information on the discontinuous reception of the UE 92 and calculates a sleep start timing and cycles (T5 and T6) of the ONU 82 that can minimize the recovery waiting time in the OLT 10 with respect to the downlink data transmitted from the BBU 81 to the UE 92. When the ONU 82 shifts to the sleep state, the OLT 10 rewrites a sleep parameter and transmits the Sleep Allow (ON) so that a calculated sleep start timing is achieved.

Here, for the sake of simplicity, although in the above drawings the single UE 92 corresponds to the single ONU 82, a plurality of the UEs 92 to be connected to the ONU 82 may be provided with respect to the single ONU 82. In this case, the UEs 92 each have a unique discontinuous reception start time and a unique cyclic parameter. The BBU 81 passes all of those information to the OLT 10, and based on all of those information, the OLT 10 may determine the sleep start timing and the cycle of the ONU 82, including the determination whether the ONU 82 shifts to the sleep state. Alternatively, such a setting is made that the BBU 81 adjusts each discontinuous reception start time and cyclic parameter of the UEs 92 so that recovery cycles are overlapped as viewed from the OLT 10, and the BBU 81 may pass the information to the OLT 10. In the latter case, there is a high possibility that a longer sleep time of the ONU 82 can be secured.

Figure 17:
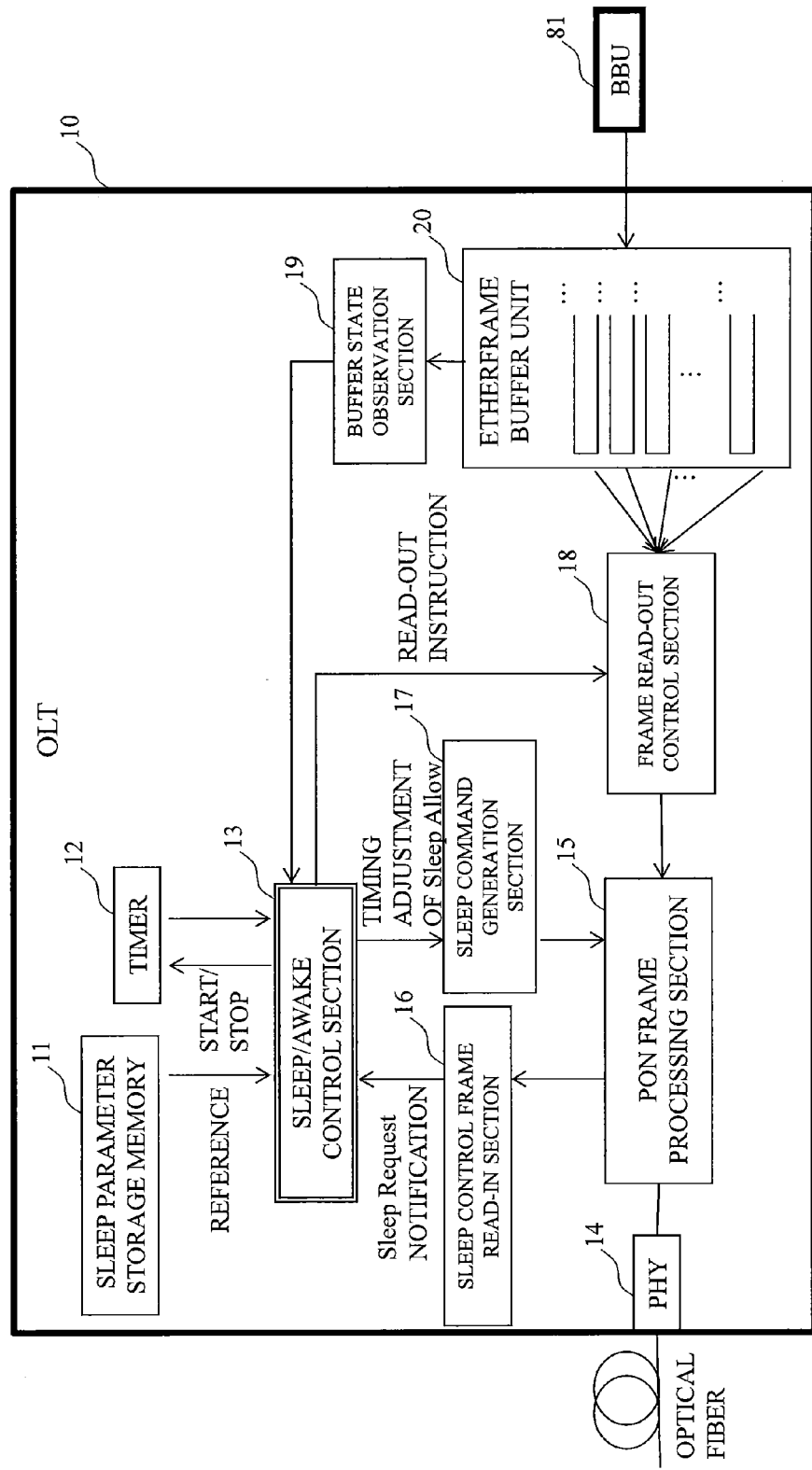
FIG. 17 shows an example of a configuration of OLT in the optical wireless access system.

FIG. 17 shows an example of a functional block diagram of the OLT 10 for realizing a sleep function of the PON. When a sleep function is not implemented, typically, an Etherframe of downlink data is subjected to PON frame processing in a PON frame processing section 15 in the order of being read from an Etherframe buffer unit 20, converted into an optical signal by PHY 14, and transmitted through an optical fiber.

A core of the sleep function is a sleep/awake control section 13 which determines the sleep state of the ONU 82, the sleep/awake control section 13 determines judgment of the transition of each of the ONUs 82 to the active state and the sleep state based on an amount of buffered Etherframes and a value of a timer 12. A buffer state observation section 19 observes the buffer of the Etherframe and makes a sleep command generation section 17 generate a message called Sleep Allow (ON) so that the ONU 82 in which there is no frame in the Etherframe buffer unit 20 is shifted to the sleep state once a time T4 has elapsed on the timer 12 from when a frame is observed last.

Whether or not the ONU 82 is in the sleep state is grasped from the fact that a sleep control frame read-in section 16 has received a message called the Sleep Request (Sleep) from the ONU 82. When the buffer state observation section 19 detects a frame addressed to the ONU 82 in the sleep state, the sleep/awake control section 13 makes the sleep command generation section 17 generate a message called the Sleep Allow (OFF) so that the ONU 82 is shifted to the active state. In this case, the sleep/awake control section 13 can adjust a timing of generation of the sleep command so that a message called the Sleep Allow (OFF) reaches the ONU 82 for aiming at a time T6 when the ONU 82 recovers from the sleep state.

Whether or not the ONU 82 shifts to the active state is grasped by the fact that the sleep control frame read-in section 16 has received a message called the Sleep Request (Awake) from the ONU 82. When it is confirmed that the ONU 82 is in the active state, the sleep/awake control section 13 instructs a frame read-out control section 18 to read out the frame addressed to the ONU 82 from an Etherframe buffer unit 20, and a frame is transmitted to the ONU 82.

Figure 18:
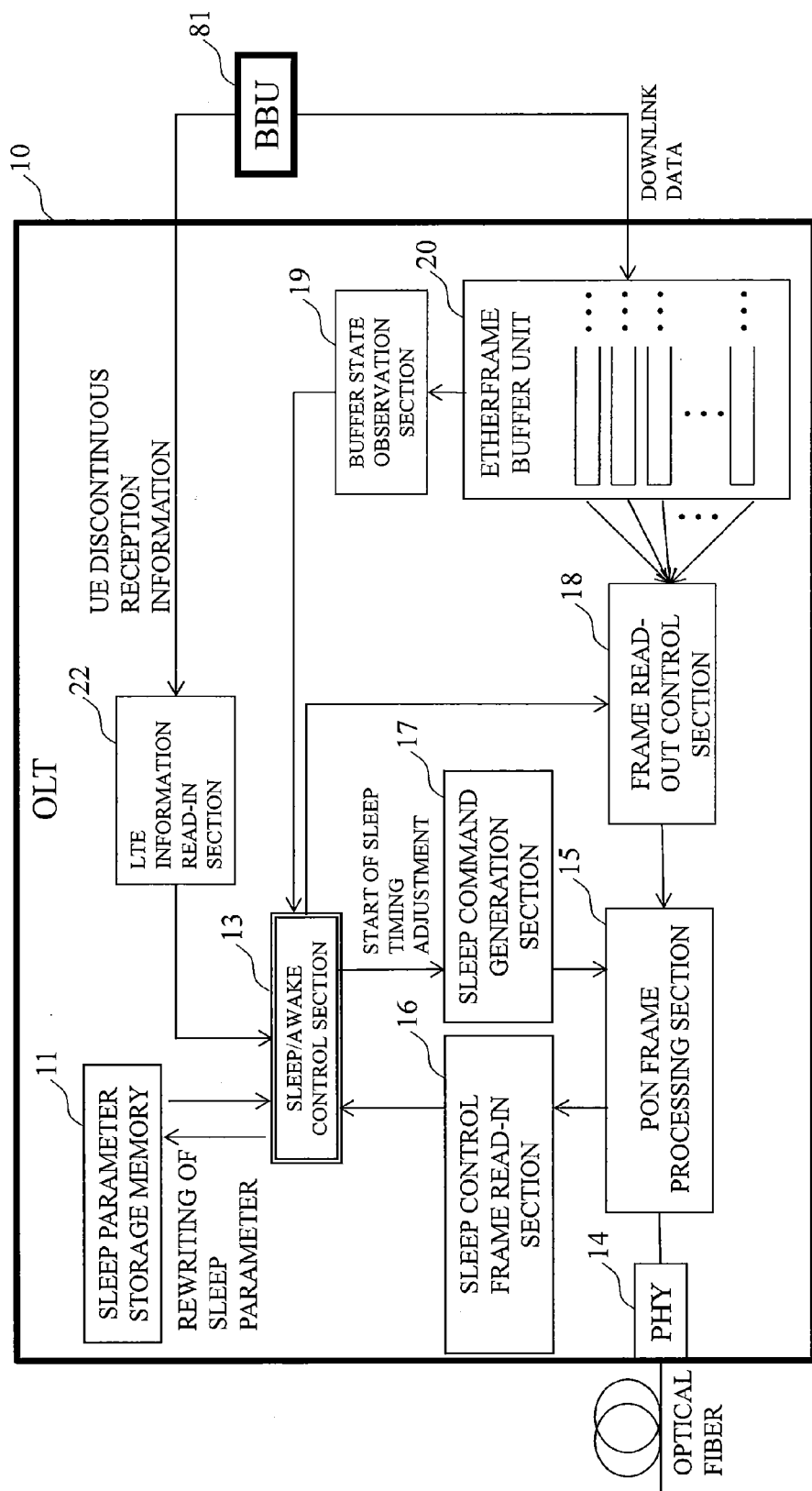
FIG. 18 shows an example of the configuration of the OLT according to an embodiment 1.

FIG. 18 shows a functional block relating to sleep control in the case where a development technology is applied, with respect to the OLT 10 of FIG. 17 realizing the above sleep operation. The important point for the realization of the methods of FIGS. 15 and 16 is that the sleep/awake control section 13 does not use the information of the timer 12 for the judgment of the transition to the sleep state of the ONU 82, and an LTE information read-in section 22 functioning as a wireless communication information read-in section receives the information on the discontinuous reception of the UE 92 from the BBU 81. Hereinafter, the details will be described.

The sleep/awake control section 13 receives the information on the discontinuous reception of one or a plurality of the UEs 92 (such as an discontinuous reception start time and the cyclic parameters T2 and T3) and calculates the sleep start timing of the ONU 82 and the cycles T5 and T6 that can minimize the recovery waiting time in the OLT 10 with respect to the downlink data transmitted from the BBU 81 to each of the UEs 92 based on the received information.

As an example of the calculation method, there is considered a method of setting T5 and T6 to such values that are the same as or the integer times T2 and T3, respectively, and setting the sleep start timing of the ONU 82 to a value being shifted by a transmission delay time from the ONU 82 to the UE 92, from a pause start timing of the UE 92.

As the calculation method, the sum of T5 and T6 may be a value that is the same as or the integer times the sum of T2 and T3. Alternatively, there may be set a value obtained by shifting a recovery timing of the ONU 82 by the transmission delay time from the ONU 82 to the UE 92 from a recovery timing of the UE 92.

Although it may be judged that the ONU 82 does not shift to the sleep state depending on the calculation result, when the ONU 82 is to shift to the sleep state as the result of the calculation, a sleep parameter storage memory 11 is rewritten based on the cyclic parameter(s) as the calculated result, and a timing of issuing a command generation instruction to the sleep command generation section 17 is adjusted so that the sleep start time is set as calculated, whereby the ONU 82 is shifted to the sleep state.

In the above case, when the downlink data is transmitted from the BBU 81 to the UE 92 for aiming at a recovery time, the sleep start timing of the ONU 82 and the cycle that can minimize the recovery waiting time in the OLT 10 should be obtained, and therefore, when the buffer state observation section 19 observes the downlink frame, even if the timing of transmitting the Sleep Allow (OFF) is not particularly adjusted, a waiting time for aiming at the recovery time of the ONU 82 is not generated or should be very short. Accordingly, after the buffer state observation section 19 has observed the downlink frame, the instruction of the Sleep Allow (OFF) can be issued to the sleep command generation section 17 at a relatively earlier timing. After that, the downlink frame is read out by the frame read-out control section 18 as soon as the Sleep Request (Awake) is returned, and the downlink frame is transmitted to the ONU 82.

As described above, in the system as shown in FIG. 2, when the downlink data is transmitted from the BBU 81 to the UE 92 for aiming at the recovery time at a timing where the UE 92 is in the discontinuous reception state and the ONU 82 is in the sleep state, the sleep start timing and the cycle of the ONU 82 that can minimize the recovery waiting time in the OLT 10 are obtained. Accordingly, when the buffer state observation section 19 of the OLT 10 has observed the downlink frame, the waiting time for aiming at the recovery time of the ONU 82 should not be generated or should be short in comparison with the prior art.

Consequently, after the buffer state observation section 19 has observed the downlink frame, the instruction of the Sleep Allow (OFF) can be issued to the sleep command generation section 17 at a relatively earlier timing.

Figure 19:
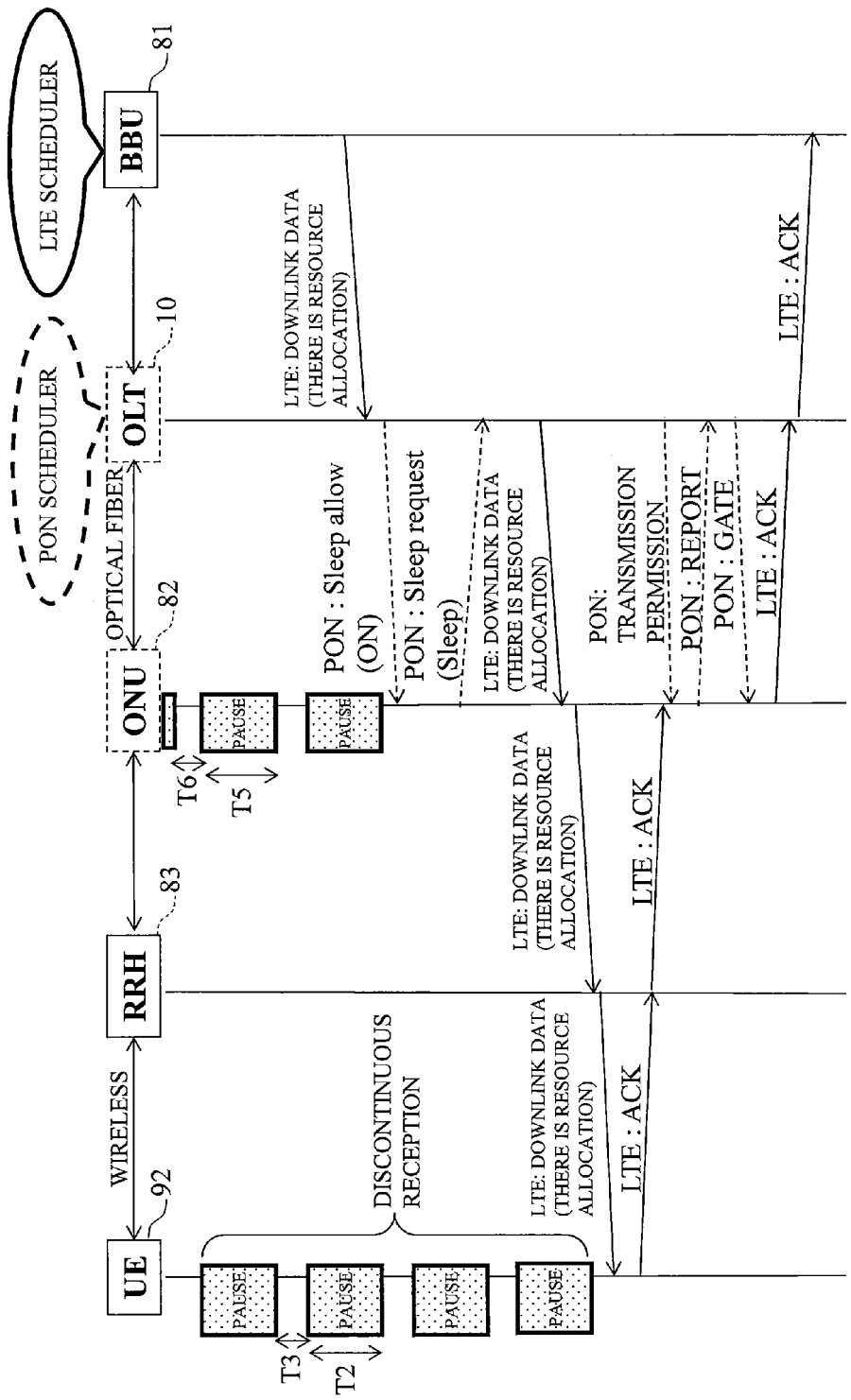
FIG. 19 shows an example of a transmission sequence of downlink data transmitted by BBU for aiming at a recovery cycle of only the discontinuous reception of the UE.

As the sequence, as shown in FIG. 19, when the BBU 81 transmits the downlink data for aiming at the recovery cycle of only the discontinuous reception of the UE 92, the recovery cycle waiting time of ONU sleep in a PON section is not generated or is reduced. Consequently, the fact that the UE 92 cannot receive the downlink data due to the recovery cycle waiting time in the PON section or retransmission due to time-out of ACK is avoided, and the transmission capacity can be used efficiently.

Embodiment 2

In the embodiment 1, when the information on the discontinuous reception of the UE 92 is transmitted from the BBU 81 to the OLT 10, a line which is physically different from a line through which usual downlink data is transmitted is used; however, there may be adopted a configuration in which a physical line is shared, and the information on the discontinuous reception of the UE 92 and the usual downlink data are identified by a control protocol in layer two or above.

Figure 20:
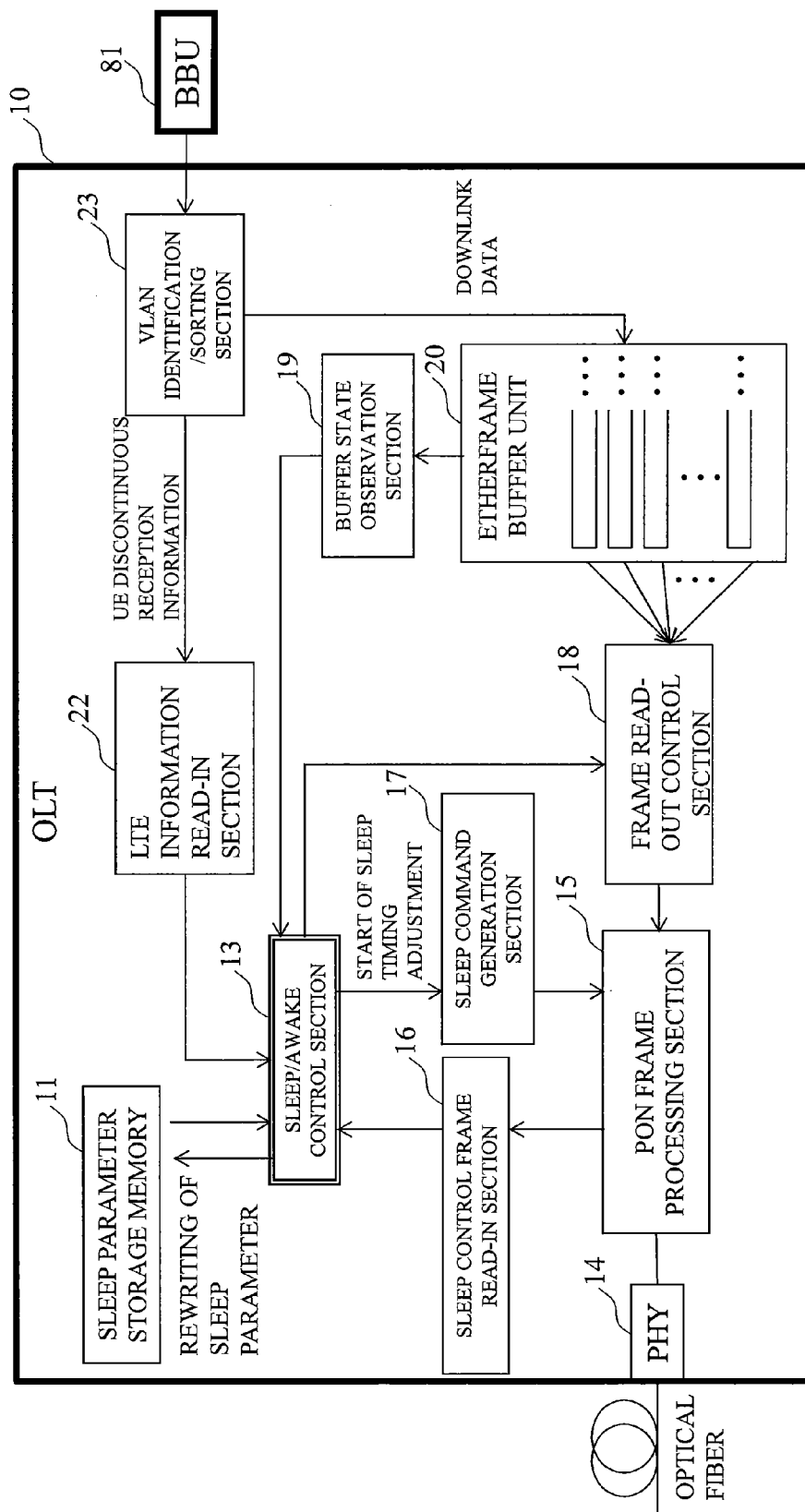
FIG. 20 shows an example of a configuration of OLT according to an embodiment 2.

FIG. 20 shows an example using VLAN. Only one physical line is provided between the BBU 81 and the OLT 10, and the BBU 81 transmits the information on the discontinuous reception of the UE 92 and the usual downlink data by different specific VLANs. The OLT 10 is provided with a VLAN identification/sorting section 23, and in the VLAN identification/sorting section 23, the information on the discontinuous reception of the UE 92 and the usual downlink data are identified by a VLAN tag of a signal from the BBU 81, and the information on the discontinuous reception of the UE 92 and the usual downlink data are sorted into an LTE information read-in section 22 and the Etherframe buffer unit 20, respectively.

Embodiment 3

Figure 21:
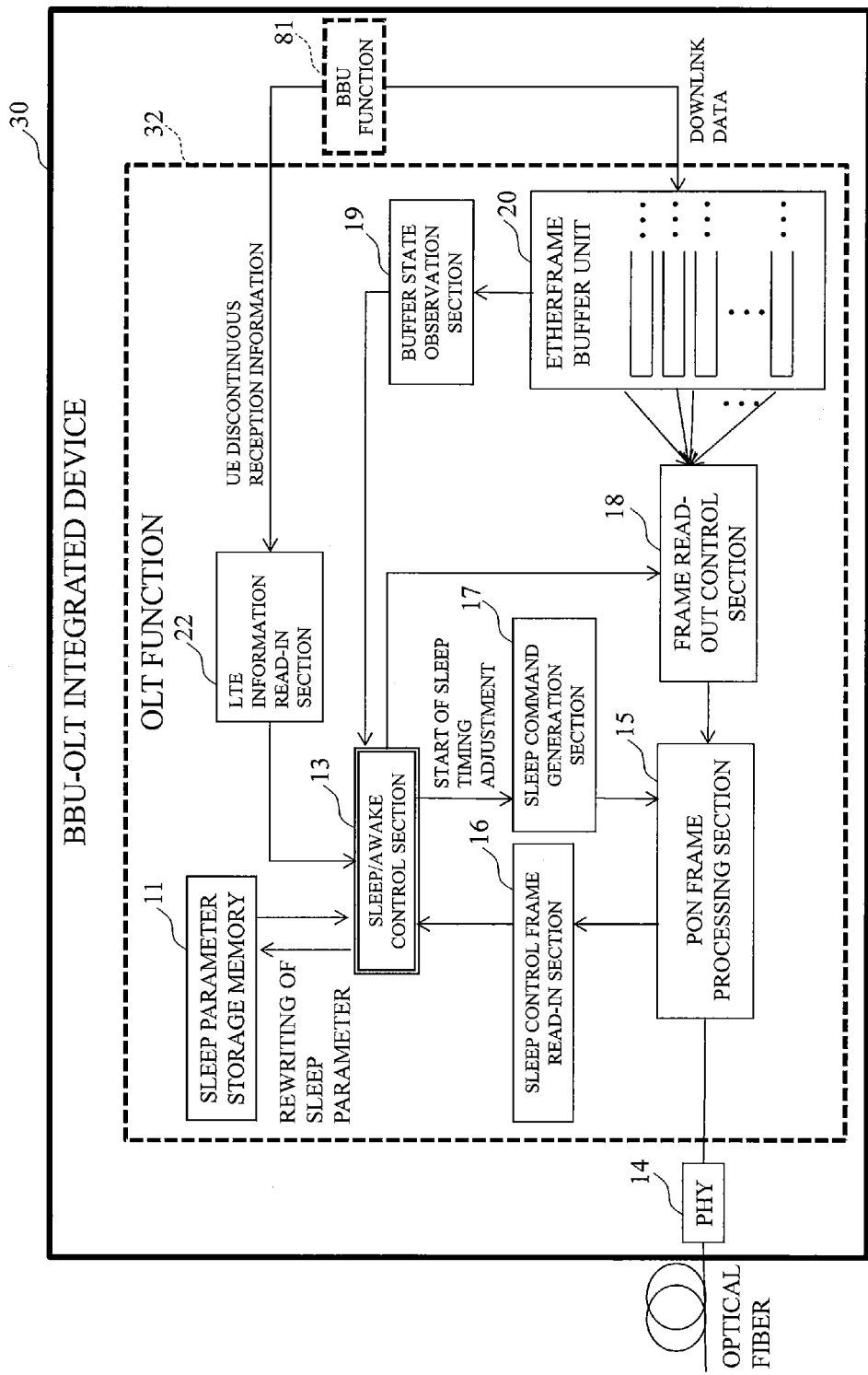
FIG. 21 shows an example of a configuration of OLT according to an embodiment 3.

Although the OLT 10 and the BBU 81 are different devices in the embodiments 1 and 2 and are connected via a physical line, they may be an integrated device having an OLT function and a BBU function. FIG. 21 shows an example of an integrated device having the BBU function and the OLT function.

Embodiment 4

Concerning the RRH 83 and the ONU 82, they may be different devices connected via a physical line or may be configured as an integrated device having their respective functions.

Embodiment 5

In the discontinuous reception, although one kind of a an discontinuous reception cycle parameter is used in the above embodiment, in some cases a plurality of stages of discontinuous reception cycles are provided, namely after the discontinuous reception for a fixed cycle T7 constituted of T2 and T3, the discontinuous reception is performed in a cycle of T8 longer than T2. In this case, although the number of the kinds of parameters including T7 and T8 is increased, their information is included in the information on the discontinuous reception of the UE 92 passed from the BBU 81 to the OLT 10.

INDUSTRIAL APPLICABILITY

The present invention can be applied to information and communication industry.

REFERENCE SIGNS LIST

10: OLT
11: sleep parameter storage memory
12: timber
13: sleep/awake control section
14: PHY
15: PON frame processing section
16: sleep control frame read-in section
17: sleep command generation section
18: frame read-out control section
19: buffer state observation section
20: Etherframe buffer unit
22: LTE information read-in section
23: VLAN identification/sorting section
32: OLT function portion
81: BBU
82: ONU
83: RRH
84: optical splitter
91: eNB
92: UE

What is claimed is:

1. An optical wireless access system in which a plurality of Optical Network Units (ONUs) are connected to an Optical Line Terminal (OLT) using optical transmission paths, and downlink data is transmitted from a baseband signal processing portion connected to the OLT to an RF signal transmitting/receiving portion connected to the ONU,
wherein the OLT obtains information on discontinuous reception of a wireless terminal, wirelessly connected to the RF signal transmitting/receiving portion, from the baseband signal processing portion and performs sleep control of the ONU based on the information.

2. The optical wireless access system according to claim 1, wherein the OLT has a wireless communication information read-in portion obtaining the information on the discontinuous reception of the wireless terminal from the baseband signal processing portion, and
wherein the wireless communication information read-in portion is connected to the baseband signal processing portion by using a line different from the downlink data.

3. The optical wireless access system according to claim 1, wherein the OLT has a wireless communication information read-in portion obtaining the information on the discontinuous reception of the wireless terminal from the baseband signal processing portion, and
wherein the wireless communication information read-in portion is connected to the baseband signal processing portion by using a line common to the downlink data and identifies the downlink data and the information on the discontinuous reception on the wireless terminal using a control protocol.

4. The optical wireless access system according to any one of claims 1 to 3, further comprising a controller which calculates a sleep start timing and a sleep cycle of the ONU so that a recovery waiting time in the OLT with respect to the downlink data can be reduced using the obtained information on the discontinuous reception.

5. The optical wireless access system according to any one of claims 1 to 3, wherein the OLT further comprises a controller which sets a sleep cycle time, a recovery cycle time, or the sum of them of the ONU to respective values that are the same as or the integer times a pause cycle time of the discontinuous reception of the wireless terminal, a recovery cycle time of the discontinuous reception of the wireless terminal, or the sum of them, using the obtained information on the discontinuous reception.

6. The optical wireless access system according to any one of claims 1 to 3, wherein the OLT further comprises a controller which starts sleep of the ONU when going back in transmission delay time from the ONU to the wireless terminal from a pause start timing of the wireless terminal, using the obtained information on the discontinuous reception.

7. The optical wireless access system according to any one of claims 1 to 3, wherein the OLT further comprises a controller which recovers the ONU when going back in transmission delay time from the ONU to the wireless terminal from a recovery time of the wireless terminal, using the obtained information on the discontinuous reception.

8. An OLT used in an optical wireless access system in which a plurality of ONUs are connected to the OLT using optical transmission paths, and downlink data is transmitted from a baseband signal processing portion connected to the OLT to an RF signal transmitting/receiving portion connected to the ONU, wherein the OLT obtains information on discontinuous reception of a wireless terminal, wirelessly connected to the RF signal transmitting/receiving portion, from the baseband signal processing portion and performs sleep control of each of the ONUs based on the information.

9. The OLT according to claim 8 comprising a wireless communication information read-in portion obtaining the information on the discontinuous reception of the wireless terminal from the baseband signal processing portion, wherein the wireless communication information read-in portion is connected to the baseband signal processing portion by using a line different from the downlink data.

10. The OLT according to claim 8 comprising a wireless communication information read-in portion obtaining the information on the discontinuous reception of the wireless terminal from the baseband signal processing portion, wherein the wireless communication information read-in portion is connected to the baseband signal processing portion by using a line common to the downlink data and identifies the downlink data and the information on the discontinuous reception of the wireless terminal using a control protocol.

11. The OLT according to any one of claims 8 to 10, further comprising a controller which calculates a sleep start timing and a sleep cycle of the ONU so that a recovery waiting time in the OLT with respect to the downlink data can be reduced using the obtained information on the discontinuous reception.

12. The OLT according to any one of claims 8 to 10, further comprising a controller which sets a sleep cycle time of the ONU, a recovery cycle time of the ONU, or the sum of them to respective values that are the same as or the integer times a pause cycle time of the discontinuous reception of the wireless terminal, a recovery cycle time of the discontinuous reception of the wireless terminal, or the sum of them, using the obtained information on the discontinuous reception.

13. The OLT according to any one of claims 8 to 10, further comprising a controller which starts sleep of the ONU when going back in transmission delay time from the ONU to the wireless terminal from a pause start timing of the wireless terminal, using the obtained information on the discontinuous reception.

14. The OLT according to any one of claims 8 to 10, further comprising a controller which recovers the ONU when going back in transmission delay time from the ONU to the wireless terminal from a recovery time of the wireless terminal, using the obtained information on the discontinuous reception.

15. A sleep control method in an optical wireless access system in which a plurality of ONUs are connected to an OLT using optical transmission paths, and downlink data is transmitted from a baseband signal processing portion connected to the OLT to an RF signal transmitting/receiving portion connected to the ONU, wherein the OLT obtains information on discontinuous reception of a wireless terminal, wirelessly connected to the RF signal transmitting/receiving portion, from the baseband signal processing portion and performs sleep control of each of the ONUs based on the information.

16. The sleep control method according to claim 15, wherein in the sleep control of each of the ONUs, the information on the discontinuous reception of the wireless terminal is obtained from the baseband signal processing portion, using a line different from the downlink data.

17. The sleep control method according to claim 15, wherein in the sleep control of each of the ONUs, the information on the discontinuous reception of the wireless terminal is obtained by identifying the downlink data and wherein the information on the discontinuous reception of the wireless terminal is obtained using a control protocol from among information obtained from the baseband signal processing portion by using a line common to the downlink data.

18. The sleep control method according to any one of claims 15 to 17, wherein in the sleep control of each of the ONUs, a sleep start timing and a sleep cycle of the ONU are calculated so that a recovery waiting time in the OLT with respect to the downlink data can be reduced using the obtained information on the discontinuous reception.

19. The sleep control method according to any one of claims 15 to 17, wherein in the sleep control of each of the ONUs, values of a sleep cycle time of the ONU, a recovery cycle time of the ONU, or the sum of them are set to respective values that are the same as or the integer times a pause cycle time of the discontinuous reception of the wireless terminal, a recovery cycle time of the discontinuous reception of the wireless terminal, or the sum of them, using the obtained information on the discontinuous reception.

20. The sleep control method according to any one of claims 15 to 17, wherein in the sleep control of each of the ONUs, sleep of the ONU is started when going back in transmission delay time from the ONU to the wireless terminal from a pause start timing of the wireless terminal, using the obtained information on the discontinuous reception.

21. The sleep control method according to any one of claims 15 to 17, wherein in the sleep control of each of the ONUs, the ONU is recovered when going back in transmission delay time from the ONU to the wireless terminal from a recovery time of the wireless terminal, using the obtained information on the discontinuous reception.

* * * * *